US012700659B2

(12) United States Patent
Morimoto et al.

(10) Patent No.: US 12,700,659 B2
(45) Date of Patent: Aug. 4, 2026

(54) TRANSPARENT ANTENNA AND ACTIVE DIMMING LAYER

(71) Applicant: Meta Platforms Technologies, LLC, Menlo Park, CA (US)

(72) Inventors: Yasuo Morimoto, Cupertino, CA (US); Afsoon Jamali, Issaquah, WA (US); Li Zhang, Campbell, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 440 days.

(21) Appl. No.: 18/523,080

(22) Filed: Nov. 29, 2023

(65) Prior Publication Data

US 2024/0272507 A1     Aug. 15, 2024

Related U.S. Application Data

(60) Provisional application No. 63/485,247, filed on Feb. 15, 2023.

(51) Int. Cl.
| | |
|---|---|
| *H01Q 1/12* | (2006.01) |
| *G02B 27/01* | (2006.01) |
| *G02F 1/155* | (2006.01) |
| *H01Q 1/27* | (2006.01) |

(52) U.S. Cl.
CPC .......... *H01Q 1/1271* (2013.01); *G02F 1/155* (2013.01); *H01Q 1/273* (2013.01); *G02B 2027/0178* (2013.01)

(58) Field of Classification Search
CPC ...... H01Q 1/1271; H01Q 1/273; H01Q 1/276;

G02B 27/017; G02B 27/0172; G02B 2027/0178; G02C 7/101; G02F 1/15; G02F 1/153; G02F 1/1533; G02F 1/155
See application file for complete search history.

(56) References Cited

U.S. PATENT DOCUMENTS

| | | | |
|---|---|---|---|
| 2023/0402736 A1* | 12/2023 | Zhu | H01Q 13/10 |
| 2024/0258682 A1* | 8/2024 | Shiu | H01Q 1/44 |
| 2025/0053035 A1* | 2/2025 | Taheri | G02F 1/13306 |

* cited by examiner

*Primary Examiner* — Robert Karacsony
(74) *Attorney, Agent, or Firm* — Foley & Lardner LLP

(57) ABSTRACT

A system may include a first transparent conductive active dimming (AD) layer deposited on a first transparent substrate. The first transparent conductive AD layer may include a minimum threshold level of electrical conductivity. The system may also include a second, different transparent conductive AD layer deposited on a second transparent substrate. The second transparent conductive AD layer may include a level of electrical conductivity that is below the minimum threshold level and may meet at least a minimum set of optical performance characteristics. The system may further include an insulative layer positioned between the first transparent conductive layer and the second transparent conductive layer, as well as an antenna feed connected to at least the first transparent conductive AD layer. The system may also include a controller configured to control power to the first and second transparent conductive AD layers. Various other apparatuses and mobile electronic devices are also disclosed.

20 Claims, 5 Drawing Sheets

100

104

105

106

101A

Base Substrate A

102A

103

102B

Base Substrate B

101B

200

201B

201A

400

404

405

406

401A

Base Substrate A 402A
403
402B

Base Substrate B

Base Substrate A 502A
503A
502B

501B

Base Substrate B 502C
503B

502D

Base Substrate C

| Example | A (Lower Sheet Resistivity) | B |
|---------|------------------------------|---|
| 1 | ITO-A | ITO-B |
| 2 | DMD | ITO |
| 3 | DMD-A | DMD-B |
| 4 | MM | ITO |
| 5 | MM | DMD |
| 6 | MM+ITO Combo | ITO |
| 7 | MM+ITO Combo | DMD |

TRANSPARENT ANTENNA AND ACTIVE DIMMING LAYER

CROSS REFERENCE TO RELATED APPLICATION

This application claims priority to and the benefit of U.S. Provisional Application No. 63/485,247, filed Feb. 15, 2023, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 4 illustrates an embodiment in which a transparent antenna and an active dimming layer include two different layers and in which each of the layers is driven as an antenna.

FIG. 5 illustrates an embodiment in which a transparent antenna and an active dimming layer include three different layers.

FIG. 6 illustrates a chart in which different example embodiments include active dimming layers and transparent antennas formed using different combinations of materials.

Figure 1:
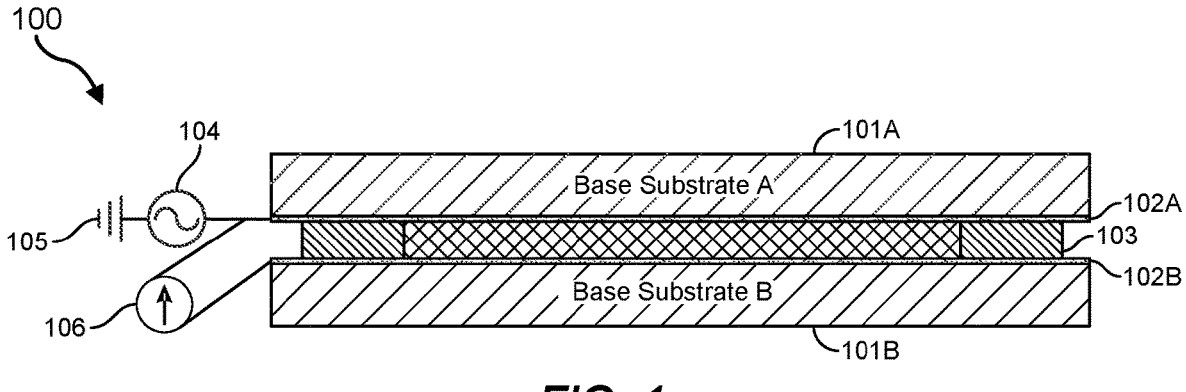
FIG. 1 illustrates an embodiment of a transparent antenna and an active dimming layer that are provided within an active dimming structure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a transparent antenna and an active dimming layer that are provided in an active dimming structure. Active dimming (AD) layers in lenses or in other optical applications may involve two or more transparent conductive sheets used as different layers. These layers may be electrochromic layers that respond to changes in voltage regulated by a controller. One of the electrochromic layers (the positive side) stores ions, while the other electrochromic layer (the negative side) receives the ions. The flow of ions to one side or the other causes changes in opacity. This, in turn, causing the lenses to lighten or darken. Often, those transparent conductive sheets are made of the same material, share the same sheet resistivity, and have the same optical characteristics.

That said, a variety of different types of transparent conductors may potentially be used as transparent antennas within an active dimming system. Each of these transparent conductors may have different sheet resistivities and optical characteristics or optical performance levels. Accordingly, when transparent conductors of the dimming layers are to be dually used as transparent antenna elements and as active dimming layers, the variances in sheet resistivity may affect the performance of the transparent antenna. Moreover, at least in some cases, the transparent conductors of the dimming layer may negatively affect the optical performance of the lenses, including the potential introduction of optical transparency, optical scattering, optical haze, or coloring.

As will be explained in greater detail below, embodiments of the present disclosure may provide systems and mobile electronic devices that implement different types of transparent conductors on different active dimming layers as transparent antennas. These different types of transparent conductors may be specifically designed to promote optimal antenna radiation (for at least one active dimming layer) and to promote optimal optical performance (for at least one other active dimming layer). By engineering and designing these active dimming layers with both antenna performance and optical performance in mind, the systems herein may implement transparent antennas within active dimming systems substantially without degrading the optical performance of these layers, and while meeting or exceeding antenna performance standards for the transparent antennas.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1, for example, illustrates an active dimming system 100 in which at least one of the active dimming layers is used as an antenna. The active dimming system 100 may include a base substrate A (101A) and a base substrate B (101B) separated by an insulative layer 103. The substrates may be made of plastic, glass, or other transparent or semi-transparent material. In some cases, the substrates 101A and 101B may be part of a lens. This lens may be part of a pair of augmented reality (AR) glasses, where each side of the glasses has a similar (or same) lens. In other cases, the substrates 101A and 101B may be part of another transparent object that uses active dimming (e.g., a rearview mirror in a vehicle).

The active dimming system 100 may also include, deposited on each of the substrates 101A/101B, transparent conductors 102A and 102B, respectively. The transparent conductors 102A/102B may be made using any of a variety of different types of materials. Moreover, in some cases, the transparent conductors 102A/102B may be made of the same materials, while in other cases, the transparent conductors are made from different materials. These materials may include, without limitation, indium tin oxide (ITO), dielectric/metal/dielectric (DMD) (where ITOs or indium zinc oxides (IZOs) may form the dielectric and silver, copper, gold, etc. may form the metal (also referred to as insulator/metal/insulator (IMI)), metal mesh, graphene, or other optically transparent materials. Any of these materials may be used as transparent active dimming layers.

At least in some cases, metal mesh may provide lower sheet resistivity. This lower resistivity may provide enhanced antenna performance and higher optical transparency but may also potentially introduce optical scattering. ITOs and DMDs may have higher sheet resistivity (which may potentially degrade antenna performance) but may provide improved optical performance (e.g., less optical haze). As the term is used herein, "optical performance" may refer to substantially any indicator or optical characteristic that shows how well the transparent conductive material performs at providing optimal optics (i.e., the ability to clearly see through the material). This may include reducing scattering, reducing coloring, reducing haze, or reducing other elements that would impede visibility.

In one embodiment, a first transparent conductive active dimming (AD) layer may be deposited on a first transparent substrate. Thus, as shown in FIG. 1, a transparent conductor 102A may form an AD layer on substrate 101A. The first transparent conductive AD layer may include or provide at least a minimum threshold level of electrical conductivity. In this example, the transparent conductor 102A may be driven by an antenna feed 104 and, as such, may radiate according to the radio signals generated by the antenna feed.

The active dimming system 100 may implement a bias tee that includes a feed inductor to deliver direct current (DC) power to a connector within the system 100 and a blocking capacitor to keep DC power from passing through to the RF receiver within the system. The bias tee may be branched between the radio frequency (RF) source and an active dimming (AD) bias source. The bias tee may include an (AD) bias cut (e.g., a series capacitance to block low frequency biasing of active dimming in between the branch and RF sources), and an RF cut (e.g., a series inductance to block a high frequency RF source in between the branch source and the AD bias source). The insulative layer 103 may separate the transparent conductor 102A and the transparent conductor 102B to improve or at least maintain active dimming functionality.

Indeed, the active dimming system 100 may include a second, different transparent conductive AD layer deposited on a second transparent substrate 101B. This second transparent conductive AD layer may include transparent conductor 102B, which may include or provide a level of electrical conductivity that is below the minimum threshold level (or, said another way, has higher sheet resistivity than the transparent conductor 102A). The second transparent conductor 102B may also be designed to meet at least a minimum set of optical performance characteristics to ensure that visibility remains high, despite the implementation of an antenna within the active dimming system 100. The insulative layer 103 may be thick enough to protect or insulate each transparent conductor from the other and, as shown in FIG. 1, may be positioned directly between the first transparent conductive layer and the second transparent conductive layer. An antenna feed 104 may be electrically connected to at least the first transparent conductive AD layer to drive the transparent conductor 102A. The antenna feed 104 (grounded at 105) may include amplifiers, tuners, signal processors, impedance matching circuits, or other antenna feed elements.

Still further, the active dimming system 100 may include a controller 106 that is configured to control power to the first and second transparent conductive AD layers. As noted above, both transparent conductors 102A and 102B may function to control the flow of light through the substrates A & B in response to voltage controls made by the controller 106. Additionally, at least one of the transparent conductors 102A/102B may be implemented as a transparent antenna to send and receive RF signals. The embodiments herein may implement different types of materials to optimize both antenna transmission and optical performance. Moreover, at least in some cases, the controller may modify control signals to the transparent conductors 102A and/or 102B based on which types of materials were used for each conductor.

Figure 2:
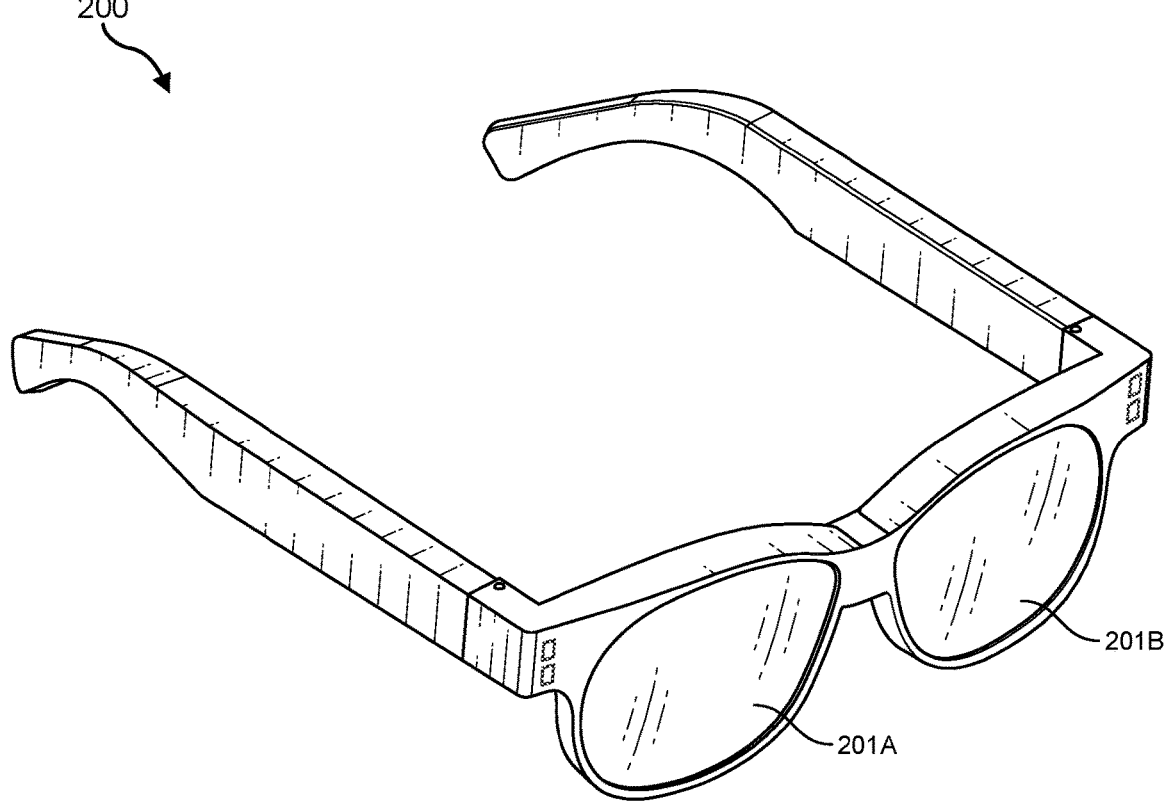
FIG. 2 illustrates a pair of augmented reality (AR) glasses in which a transparent antenna and an active dimming layer may be implemented.

FIG. 2 illustrates an embodiment of a pair of AR glasses 200. The AR glasses may be any type of augmented reality or mixed reality glasses that project at least some amount of digital content into the user's real-world view. In this embodiment, the AR glasses 200 may include two lenses, 201A and 201B. These lenses may include active dimming elements, including at least some of those active dimming elements shown in FIG. 1. The active dimming lenses may thus control the amount of light that travels through the lenses and reaches the user's eyes. While shown as including two lenses, it will be appreciated that the embodiments herein may include one, three, or substantially any number of active dimming lenses or transparent conductors deposited on other substrates.

Figure 3:
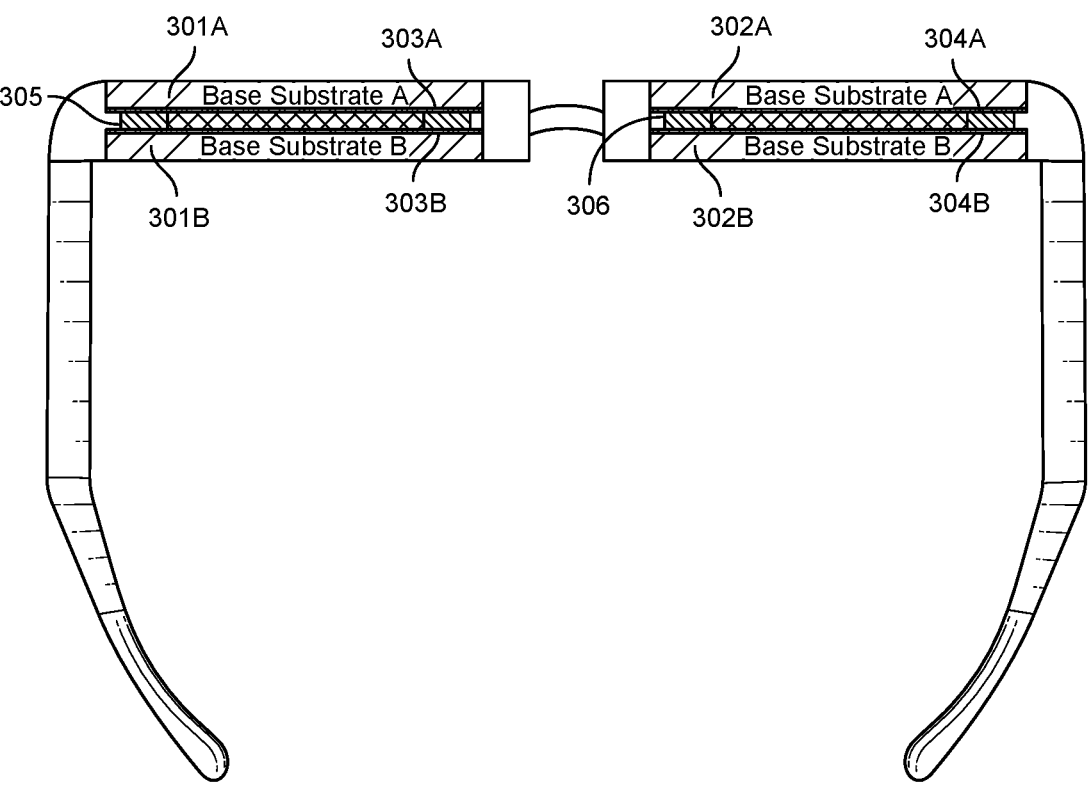
FIG. 3 illustrates an embodiment in which a transparent antenna and an active dimming layer are implemented within a pair of AR glasses.

FIG. 3 illustrates an embodiment in which two sets of active dimming systems (e.g., 100 from FIG. 1) may be implemented as lenses in AR glasses (e.g., AR glasses 200 of FIG. 2). The AR glasses 300 of FIG. 3 may include a left-side lens having a substate 301A, a transparent conductor 303A, an insulative layer 305 that protects other layer from the transparent conductor 303A's radiation, a second transparent conductor 303B, and a second transparent substrate 301B. The AR glasses 300 of FIG. 3 may also include a right-side lens having a substate 302A, a transparent conductor 304A, an insulative layer 306 that protects other layer from the transparent conductor 304A's radiation, a second transparent conductor 304B, and a second transparent substrate 302B. The left-side and right-side lenses may be linked together via a nose bridge or other structural element(s) and may also include side arms that allow the AR glasses 300 to rest on a user's ears.

As noted above, the first transparent conductive AD layer may have a sheet resistivity that is above a minimum threshold value. At least in some embodiments, the transparent conductor 303A may be driven by the antenna feed (e.g., 104 of FIG. 1) and may act as a transparent antenna, in addition to functioning as an active dimming layer. In other cases, the transparent conductor 303B may be driven, additionally or alternatively, by the antenna feed. In cases where the transparent conductor 303A is driven by the RF feed, the sheet resistivity for the transparent conductor 303A may be formed, designed, generated, or manufactured so that its sheet resistivity is below a maximum threshold value. Ensuring that the sheet resistivity is sufficiently low allows the transparent conductor 303A to function more optimally as an antenna (i.e., it allows radiation with less resistance, making the radiation more efficient). In some examples, a maximum resistivity value may be set to a value between about 0.1 Ohms/sq and 12 Ohm/sq. The transparent conductive AD layer 303B may have a sheet resistivity that is higher than the sheet resistivity of the transparent conductive AD layer 303A.

Thus, for example, if metal mesh is used for the transparent conductor 303A, the metal mesh may have a sheet resistivity of 0.1 Ohms/sq. In this example, ITO may be used as the other transparent conductor 303B having a sheet resistivity of 8.6 Ohms/sq. In such an example, the sheet resistivity of transparent conductor 303A may be below a maximum value (e.g., 5 Ohms/sq), while the sheet resistivity of the transparent conductor 303B may be above the sheet resistivity of the transparent conductor 303A (at 8.6 Ohms/sq.). This arrangement may allow the metal mesh to operate as both an antenna and an active dimming layer but may operate most efficiently as an antenna. This arrangement may also allow the ITO layer to operate as both an antenna and an active dimming layer but operate most efficiently as an active dimming layer.

In some cases, in order to achieve these sheet resistivity values, the metal mesh or ITO may be applied in thinner or thicker layers to achieve the designed resistivity. Or, the metal mesh or ITO material may be applied to a greater or smaller portion of the lens, or may be applied in combination with other materials (as in a DMD). Thus, the thickness and/or surface area taken up by the transparent conductive material may control or dictate the sheet resistivity of each layer. In some cases, the thickness may be increased or decreased to reduce or increase sheet resistivity to allow better function as an antenna or as an active dimming layer. Similarly, the amount of surface area covered may be increased or decreased to reduce or increase sheet resistivity to allow better function as an antenna or as an active dimming layer. As noted above, lower resistivity may lead to better antenna performance and/or better AD performance, while higher resistivity may lead to better optical performance and/or the same active dimming performance.

FIG. 4 illustrates an embodiment 400 in which an RF feed 404 may be electrically connected to both the transparent conductor 402A as well as the transparent conductor 402B. As in the examples above, the transparent conductor 402A may be deposited on or otherwise attached to base substrate A (401A), and the transparent conductor 402B may be deposited on or attached to base substrate B (401B). These two transparent conductors may be separated by a protective or insulative layer 403. The transparent conductive layers 402A and 402B may both be driven by a controller 406 that controls or regulates the voltages to each layer. For example, if the glasses are to be darkened, the controller 406 will increase the voltage sent to each of the transparent conductive layers 402A and 402B. Or, if the glasses are to be lightened, the controller 406 will decrease the voltage sent to the transparent conductive layers 402A and 402B. In some cases, each of the layers may receive the same amount of voltage, while in other cases, each layer will receive a different amount of voltage. In this manner, the controller 406 may fine-tune how much light is allowed through the lenses by controlling the voltage to each transparent conductive layer individually.

In this embodiment, both of the transparent conductive layers 402A and 402B may also be driven by an RF input 404 (grounded at 405). The RF input 404 may be an antenna feed capable of transmitting or receiving wireless RF signals. In such cases, where both transparent conductive layers are driven by an RF input, the materials for the transparent conductive layers 402A and 402B may be selected in a specific manner. Specifically, both transparent conductive layers 402A and 402B may be selected to provide maximum active dimming efficacy, while still providing sufficiently high conductivity (or sufficiently low sheet resistivity) to provide at least a minimum level of antenna radiation (e.g., a minimum total radiative power (TRP)). Thus, the RF input 404 may be applied not only to the upper transparent conductive layer 402A, but also to transparent conductive layer 402B and potentially any other transparent conductive layers.

For example, FIG. 5 illustrates an embodiment 500 in which multiple different transparent conductive layers are implemented. The active dimming embodiment 500 of FIG. 5 includes three substrates (501A, 501B, and 501C) and four transparent conductive layers (502A, 502B, 502C and 502D, where substrates A and B are separated by an insulative layer 503A and where substrates B and C are separated by an insulative layer 503B. In this embodiment, an RF input 504 (grounded at 505) may be electrically connected to transparent conductor 502A. In some cases, the RF input 504 may be connected to other transparent conductors as well (e.g., 502B, 502C, and/or 502D). A controller 506 may be electrically connected to each of the four transparent conductive layers 502A-502D. The controller 506 may control each of the four transparent conductive layers individually. In some cases, the controller 506 may control each transparent conductive layer according to which type of material was used as the transparent conductor.

For instance, at least in some embodiments, the controller 506 may access information identifying the type of transparent conductive material used for each layer. In other cases, the controller 506 may determine, based on sheet resistivity, conductivity, or other electrical properties, which type of material has been used to form each of the transparent conductors. Regardless of how the knowledge is obtained, the controller 506 may control and regulate power to each transparent conductive layer individually, supplying more or less power based on which optical characteristics are desired (e.g., brightness or dimness), and/or supplying more or less power based on the level of conductivity or sheet resistance. The controller 506 may thus regulate the amount of power to the transparent conductive active dimming layers and may change the amount of power sent to each layer over time (e.g., on a periodic basis (e.g., each second, each five second, each 60 seconds, each 10 minutes, etc.) or on an as needed basis (e.g., when an ambient light detector on the AR glasses (e.g., 200 of FIG. 2) determines that the active dimming is to be increased or decreased).

Additionally or alternatively, the controller 506 may increase or decrease the amount of power routed to the transparent conductive layer 502A (or other RF-driven layers) based on a determined need for more or less radiative power (e.g., in a location having poor wireless reception). Accordingly, the controller 506 may dynamically determine the appropriate amount of power to send to each transparent conductive layer based on current wireless transmission needs and active dimming needs, thereby constantly adjusting to ensure optimal wireless operation and optimal optical performance.

FIG. 6 illustrates a chart 600 showing different combinations of transparent conductive materials. In some embodiments, layer A (601) may have a lower sheet resistivity, making layer A more suitable for use as an antenna. Layer B (602) may have a higher sheet resistivity but may have more optimal optical performance characteristics (e.g., less scattering, less coloring, less haze, etc.). In each of these examples 1-7, different materials are shown as being used for transparent conductors. It will be understood, however, that any of these examples may use the same materials for both layers (or for each layer) of transparent conductive material.

In some cases, as in Example 1, transparent conductive layer A may be made of ITO type A, while the transparent conductive layer B may be formed using ITO type B (which may have the same or a different sheet resistivity and may have the same or different optical properties). In Example 2, the transparent conductive layer A may be formed as a DMD layer, where ITOs or IZOs may be the dielectric used, while copper, silver, gold, or similar alloys may be used as the metal, and ITO may be used for transparent conductive layer B. Example 3 shows two different DMD layers, Example 4 shows a metal mesh used on transparent conductive layer A and an ITO material used on transparent conductive layer B, Example 5 shows metal mesh and DMD, Example 6 shows a metal mesh+ITO combination material on transparent conductive layer A and ITO on transparent conductive layer B, and Example 7 shows a metal mesh+ITO combination material on transparent conductive layer A and a DMD material used on transparent conductive layer B. Other combinations are possible, and the examples 1-7 shown in chart 600 are only examples of such combinations.

Still further, it will be understood that any of these layers and materials may be applied in different thicknesses or in different amounts of surface area. The thickness or the amount of surface area may change the amount of sheet resistivity or the amount of conductance, as well as potentially changing the optical performance. Accordingly, at least in some examples, the top transparent conductive AD layer formed using ITO-A may be below a maximum level of thickness or below a maximum amount of surface area (providing appropriate resistivity for antenna operation), and the bottom transparent conductive AD layer formed using ITO-B may be above the maximum level of thickness or surface area. Moreover, as noted above, the controller may determine the electrical and optical properties of each layer and may control the active dimming and/or delivery of the RF input based on the electrical and optical properties of those layers. This may ensure that the optimal transparent conductive layer is used for antenna operation and that the optimal transparent conductive layer is used for active dimming, providing optimal physical conditions for each function.

A corresponding mobile electronic device may also be provided, which includes: a first transparent conductive active dimming (AD) layer deposited on a first transparent substrate, the first transparent conductive AD layer including at least a minimum threshold level of electrical conductivity, a second, different transparent conductive AD layer deposited on a second transparent substrate, the second transparent conductive AD layer including a level of electrical conductivity that is below the minimum threshold level and further meeting at least a minimum set of optical performance characteristics, an insulative layer positioned between the first transparent conductive layer and the second transparent conductive layer, an antenna feed connected to at least the first transparent conductive AD layer, and a controller configured to control power to the first and second transparent conductive AD layers.

Still further, a corresponding apparatus may be provided that includes: a first transparent conductive active dimming (AD) layer deposited on a first transparent substrate, the first transparent conductive AD layer including at least a minimum threshold level of electrical conductivity, a second, different transparent conductive AD layer deposited on a second transparent substrate, the second transparent conductive AD layer including a level of electrical conductivity that is below the minimum threshold level and further meeting at least a minimum set of optical performance characteristics, an insulative layer positioned between the first transparent conductive layer and the second transparent conductive layer, an antenna feed connected to at least the first transparent conductive AD layer, and a controller configured to control power to the first and second transparent conductive AD layers.

Example Embodiments

Example 1. A system comprising: a first transparent conductive active dimming (AD) layer deposited on a first transparent substrate, the first transparent conductive AD layer including at least a minimum threshold level of electrical conductivity, a second, different transparent conductive AD layer deposited on a second transparent substrate, the second transparent conductive AD layer including a level of electrical conductivity that is below the minimum threshold level and further meeting at least a minimum set of optical performance characteristics, an insulative layer positioned between the first transparent conductive layer and the second transparent conductive layer, an antenna feed connected to at least the first transparent conductive AD layer, and a controller configured to control power to the first and second transparent conductive AD layers.

Example 2. The system of example 1, wherein the first transparent conductive AD layer and the first transparent substrate comprises a first lens, and wherein the second transparent conductive AD layer and the second transparent substrate comprises a second lens.

Example 3. The system of any of examples 1-2, wherein the first lens and the second lens comprises a pair of AD lenses in pair of augmented reality (AR) glasses.

Example 4. The system of any of examples 1-3, wherein the first transparent conductive AD layer has a sheet resistivity below a maximum threshold value.

Example 5. The system of any of examples 1-4, wherein the second transparent conductive AD layer has a sheet resistivity that is higher than the sheet resistivity of the first transparent conductive AD layer.

Example 6. The system of any of examples 1-5, wherein the first transparent conductive AD layer and the second transparent conductive AD layer are each formed using the same materials.

Example 7. The system of any of examples 1-6, wherein the first transparent conductive AD layer and the second transparent conductive AD layer are formed using indium tin oxide (ITO).

Example 8. The system of any of examples 1-7, wherein the first transparent conductive AD layer formed using ITO is below a maximum level of thickness, and wherein the second transparent conductive AD layer formed using ITO is above the maximum level of thickness.

Example 9. The system of any of examples 1-8, wherein the controller regulates power to the first and second transparent conductive AD layers based on the level of conductivity and the set of optical performance characteristics, respectively.

Example 10. The system of any of examples 1-9, wherein the first transparent conductive AD layer and the second transparent conductive AD layer are each formed using different materials.

Example 11. The system of any of examples 1-10, wherein the first transparent conductive AD layer is formed using ITO, and wherein the second transparent conductive AD layer is formed using a dielectric/metal/dielectric (DMD) material.

Example 12. The system of any of examples 1-11, wherein the first transparent conductive AD layer is formed using ITO, and wherein the second transparent conductive AD layer is formed using a transparent conductive mesh.

Example 13. The system of any of examples 1-12, wherein the first transparent conductive AD layer is formed using ITO, and wherein the second transparent conductive AD layer is formed using a combination of transparent conductive mesh and ITO.

Example 14. A mobile electronic device comprising: a first transparent conductive active dimming (AD) layer deposited on a first transparent substrate, the first transparent conductive AD layer including at least a minimum threshold level of electrical conductivity, a second, different transparent conductive AD layer deposited on a second transparent substrate, the second transparent conductive AD layer including a level of electrical conductivity that is below the minimum threshold level and further meeting at least a minimum set of optical performance characteristics, an insulative layer positioned between the first transparent conductive layer and the second transparent conductive layer, an antenna feed connected to at least the first transparent conductive AD layer, and a controller configured to control power to the first and second transparent conductive AD layers.

Example 15. The mobile electronic device of example 13, wherein the first transparent conductive AD layer and the first transparent substrate comprises a first lens, and wherein the second transparent conductive AD layer and the second transparent substrate comprises a second lens.

Example 16. The mobile electronic device of any of examples 13-15, wherein the first lens and the second lens comprises a pair of AD lenses in pair of augmented reality (AR) glasses.

Example 17. The mobile electronic device of any of examples 13-16, wherein the first transparent conductive AD layer has a sheet resistivity below a maximum threshold value.

Example 18. The mobile electronic device of any of examples 13-17, wherein the second transparent conductive AD layer has a sheet resistivity that is higher than the sheet resistivity of the first transparent conductive AD layer.

Example 19. The mobile electronic device of any of examples 13-18, wherein the first transparent conductive AD layer and the second transparent conductive AD layer are each formed using the same materials.

Example 20. An apparatus comprising: a first transparent conductive active dimming (AD) layer deposited on a first transparent substrate, the first transparent conductive AD layer including at least a minimum threshold level of electrical conductivity, a second, different transparent conductive AD layer deposited on a second transparent substrate, the second transparent conductive AD layer including a level of electrical conductivity that is below the minimum threshold level and further meeting at least a minimum set of optical performance characteristics, an insulative layer positioned between the first transparent conductive layer and the second transparent conductive layer, an antenna feed connected to at least the first transparent conductive AD layer, and a controller configured to control power to the first and second transparent conductive AD layers.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
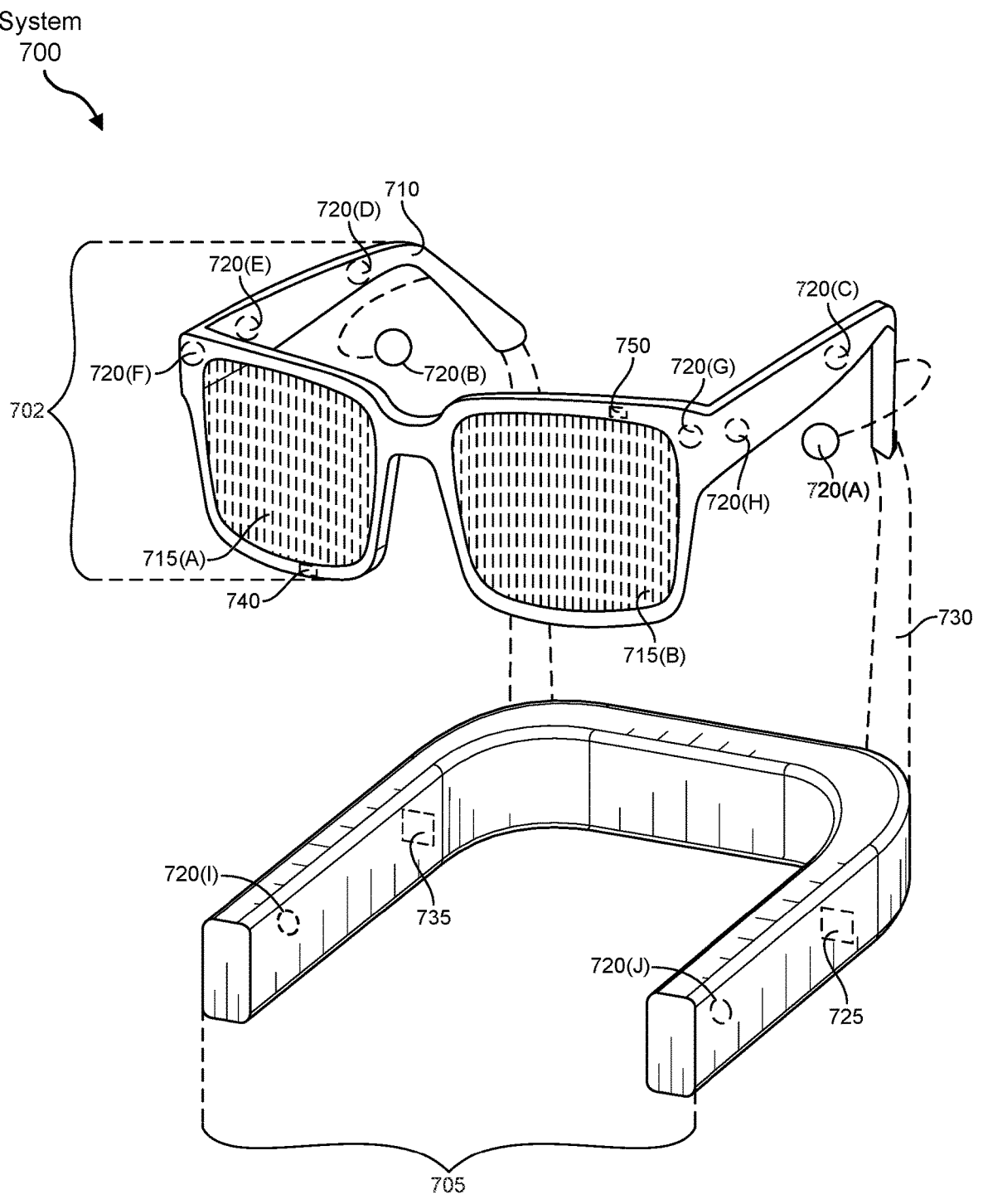
FIG. 7 is an illustration of exemplary augmented-reality glasses that may be used in connection with embodiments of this disclosure.
Figure 8:
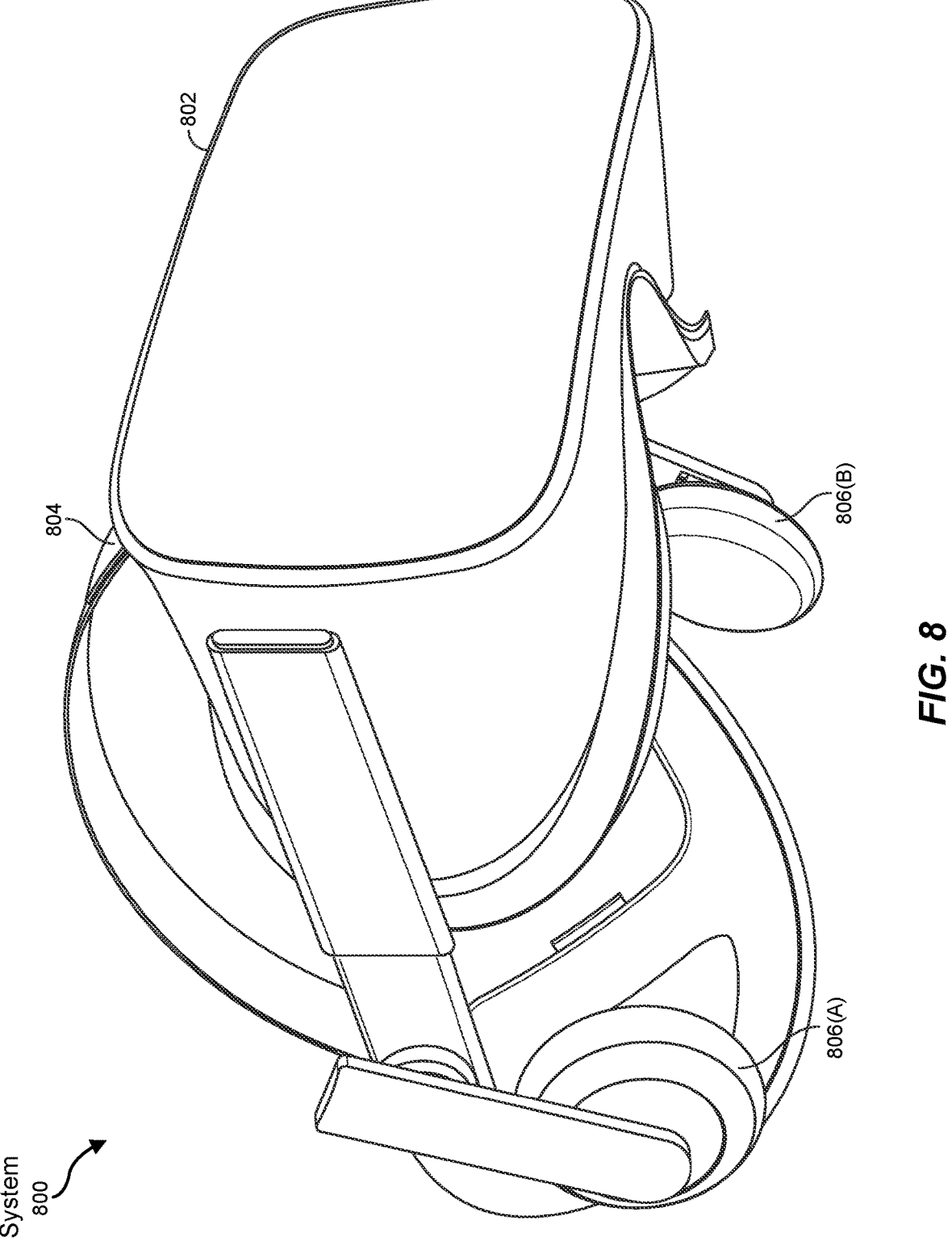
FIG. 8 is an illustration of an exemplary virtual-reality headset that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-720(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(I) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality system 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-ofarrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium-ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a first transparent conductive active dimming (AD) layer deposited on a first transparent substrate, the first transparent conductive AD layer including at least a minimum threshold level of electrical conductivity;
a second, different transparent conductive AD layer deposited on a second transparent substrate, the second transparent conductive AD layer including a level of electrical conductivity that is below the minimum threshold level and further meeting one or more optical performance characteristics;
an insulative layer positioned between the first transparent conductive layer and the second transparent conductive layer;
an antenna feed connected to at least the first transparent conductive AD layer; and
a controller configured to control power to the first and second transparent conductive AD layers.

2. The system of claim 1, wherein the first transparent conductive AD layer and the first transparent substrate comprises a first lens, and wherein the second transparent conductive AD layer and the second transparent substrate comprises a second lens.

3. The system of claim 2, wherein the first lens and the second lens comprises a pair of AD lenses in pair of augmented reality (AR) glasses.

4. The system of claim 1, wherein the first transparent conductive AD layer has a sheet resistivity below a maximum threshold value.

5. The system of claim 1, wherein the second transparent conductive AD layer has a sheet resistivity that is higher than the sheet resistivity of the first transparent conductive AD layer.

6. The system of claim 1, wherein the first transparent conductive AD layer and the second transparent conductive AD layer are each formed using the same materials.

7. The system of claim 6, wherein the first transparent conductive AD layer and the second transparent conductive AD layer are formed using indium tin oxide (ITO).

8. The system of claim 6, wherein the first transparent conductive AD layer formed using ITO is below a maximum level of thickness, and wherein the second transparent conductive AD layer formed using ITO is above the maximum level of thickness.

9. The system of claim 1, wherein the controller regulates power to the first and second transparent conductive AD layers based on the level of conductivity and the one or more optical performance characteristics, respectively.

10. The system of claim 1, wherein the first transparent conductive AD layer and the second transparent conductive AD layer are each formed using different materials.

11. The system of claim 10, wherein the first transparent conductive AD layer is formed using ITO, and wherein the second transparent conductive AD layer is formed using a dielectric/metal/dielectric (DMD) material.

12. The system of claim 10, wherein the first transparent conductive AD layer is formed using ITO, and wherein the second transparent conductive AD layer is formed using a transparent conductive mesh.

13. The system of claim 10, wherein the first transparent conductive AD layer is formed using ITO, and wherein the second transparent conductive AD layer is formed using a combination of transparent conductive mesh and ITO.

14. A mobile electronic device comprising:
a first transparent conductive active dimming (AD) layer deposited on a first transparent substrate, the first transparent conductive AD layer including at least a minimum threshold level of electrical conductivity;
a second, different transparent conductive AD layer deposited on a second transparent substrate, the second transparent conductive AD layer including a level of electrical conductivity that is below the minimum threshold level and further meeting-one or more optical performance characteristics;
an insulative layer positioned between the first transparent conductive layer and the second transparent conductive layer;
an antenna feed connected to at least the first transparent conductive AD layer; and
a controller configured to control power to the first and second transparent conductive AD layers.

15. The mobile electronic device of claim 14, wherein the first transparent conductive AD layer and the first transparent substrate comprises a first lens, and wherein the second transparent conductive AD layer and the second transparent substrate comprises a second lens.

16. The mobile electronic device of claim 15, wherein the first lens and the second lens comprises a pair of AD lenses in pair of augmented reality (AR) glasses.

17. The mobile electronic device of claim 14, wherein the first transparent conductive AD layer has a sheet resistivity below a maximum threshold value.

18. The mobile electronic device of claim 14, wherein the second transparent conductive AD layer has a sheet resistivity that is higher than the sheet resistivity of the first transparent conductive AD layer.

19. The mobile electronic device of claim 18, wherein the first transparent conductive AD layer and the second transparent conductive AD layer are each formed using the same materials.

20. An apparatus comprising:
a first transparent conductive active dimming (AD) layer deposited on a first transparent substrate, the first transparent conductive AD layer including at least a minimum threshold level of electrical conductivity;
a second, different transparent conductive AD layer deposited on a second transparent substrate, the second transparent conductive AD layer including a level of electrical conductivity that is below the minimum threshold level and further meeting one or more optical performance characteristics;
an insulative layer positioned between the first transparent conductive layer and the second transparent conductive layer;
an antenna feed connected to at least the first transparent conductive AD layer; and
a controller configured to control power to the first and second transparent conductive AD layers.

* * * * *